Patented Nov. 10, 1942

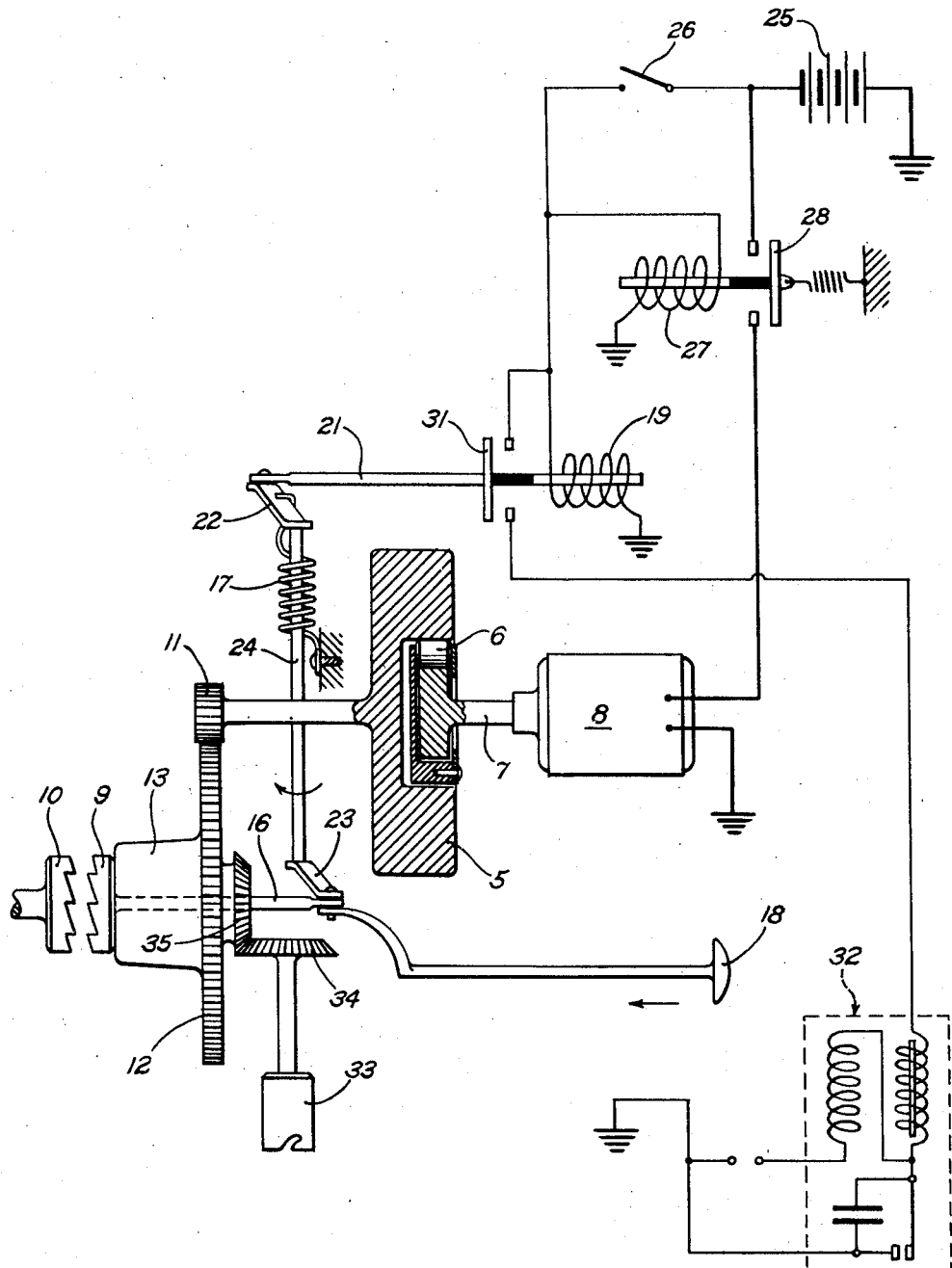

2,301,440

UNITED STATES PATENT OFFICE 2,301,440

ENGINE STARTING MECHANISM

Romeo M. Nardone, East Orange, N. J., assignor to Bendix Aviation Corporation, South Bend, Ind., a corporation of Delaware Application November 25, 1938, Serial No. 242,406

5 Claims. (Cl. 123—179)

This invention relates to engine starting mechanism and more particularly to means for controlling both the energization of such a starting mechanism and the establishment of driving connection between the mechanism and the engine to be started.

In many types of engine starting devices, it is desirable to provide mechanism which is normally disengaged from the engine to be started, but shiftable into engagement therewith by means functioning more or less independently of the prime actuating instrumentalities of the starter. Thus, for example, in many types of automobile starters there is employed a so-called manual shift in which a pinion, or equivalent engine engaging member, is shifted to the working position by a lever or other means under the control of the operator even before any rotation of the starter prime mover. In other cases, as for example, in engine starters of the inertia type, such as that dirclosed in the Lansing Patent No. 1,833,948, electromagnetic means distinct from the starter prime mover serve to actuate the engine engaging clutch entirely independently of and in fact only after such prime mover has been de-energized. That is, the prime mover (shown as an electric motor in the aforesaid Lansing patent, and similarly shown in the preferred embodiment of the present invention) is first energized for a period of time sufficient to accelerate the starter flywheel (constituting the inertia element of the device) to the desired speed, whereupon switch mechanism is manually operative to de-energize the motor and at the same time energize a solenoid which actuates the engine engaging element.

The present invention constitutes an improvement on the controlling means and method of operation of the above identified patent in the sense that the meshing solenoid is adapted for energization concurrently with energization of the starter prime mover whereby the device may function as a direct cranking starter without any appreciable preliminary acceleration of the starter flywheel prior to meshing; the said meshing solenoid being further adapted for energization independently of any use of the starter prime mover at all—for example, should the prime mover be disabled for any reason, or should there be a desire to save electric energy and to utilize therefor hand accelerating means for the storage of the cranking energy in the flywheel prior to the energization of the solenoid controlling the engagement of the starter with the engine. In this latter connection a feature of the invention is the provision of a relationship between the starter prime mover (herein to be an electric motor so wound as to have high torque and relatively low speed characteristics) and the starter flywheel which makes it possible to accelerate the flywheel manually to a speed far in excess of the speed capacity of the prime mover, such acceleration being brought about independently of the prime mover and without imparting any rotary movement thereto. At the same time the invention contemplates the construction and inter-relationship of the said connections between prime mover and flywheel in such manner as to render the flywheel subject to direct energization by said prime mover, without any preliminary storage of energy in the flywheel, and concurrently with establishment of driving connection between the starter and engine, whenever this prime mover actuated mode of engine starting is desired.

Other objects of the invention are to provide novel and improved means for controlling the operation of the inter-related parts employed in a device of the class described, and in the specific construction and inter-relation of such parts, which further objects will appear more fully from an examination of the following detailed description when read with reference to the accompanying drawing showing one embodiment of the present invention.

It is to be understood, however, that the drawing is merely illustrative and is not designed to indicate the limits of the invention, reference being had for this purpose to the appended claims.

In the drawing there is shown a representation, mainly diagrammatic, of one type of engine starting mechanism to which the present invention is applicable. As shown therein the flywheel 5 surrounds a one-way roller clutch 6 whose inner race is integrated with the extended shaft 7 of the electric motor 8 constituting the "prime mover" referred to in the appended claims. Interposed between the engine engaging clutch member 9 and the flywheel 5 are the usual gear train and capacity controlling pre-set clutch, the former being shown as having at one end a high speed pinion 11 rotatable with flywheel 5, and at the low speed end a gear 12 to rotate the barrel 13 housing the said pre-set clutch in the usual manner, as in the aforesaid Lansing patent, whereby rotation is imparted to the engine engaging clutch element 9. Movement of the clutch member 9 into engagement with corresponding clutch member 10 of the engine is under the control of axially movable rod 16 passing centrally and slidably through clutch barrel 13 and connecting with clutch member 10 through yieldable means, as in the aforesaid Lansing patent, or directly, as indicated. The rod is normally restrained in the clutch-retracting position shown, by suitable means such as coiled torsion spring 17 corresponding to the coiled torsion spring 106 of the aforesaid Lansing patent, and is movable into the clutch meshing position by manual means 18 or by energization of solenoid 19, whose plunger 21 connects with rod 16 by way of the intervening levers 22 and 23, and the rock-shaft 24 about which the spring 17 is coiled.

The winding of solenoid 19 is in the battery circuit containing hand-switch 26 and solenoid 27, the latter having a plunger-carried switch element 28 controlling flow of current to motor 8. A similar plunger-carried switch element 31 controls flow of current to the auxiliary ignition device 32 of the "booster" type similar to the auxiliary ignition device 17 of Patent No. 2,099,804 granted to Martin J. Finnegan on November 23, 1937 and adapted to supply high tension energy to the engine cylinders during the cranking operation.

Meshing solenoid 19 is energized at the same time the motor is operated, and the starter jaw is thereby immediately engaged to the engine jaw. The engine is cranked directly by electric motor 8. A booster coil switch 31 is closed when solenoid plunger 21 moves up to engage the starter to the engine. Closing of the switch operates the booster coil 32 which supplies a shower of sparks to the engine cylinders.

When the engine starts, the motor current is cut off, and the meshing solenoid is de-energized, the booster coil switch is opened, the jaw is retracted and the motor comes to rest due to re-opening of switches 26 and 28.

In case of motor failure or if the battery charge is weak, the starter may be operated on the "delayed-mesh" principle by accelerating the flywheel by hand through the hand-cranking shaft 33 connecting with the starter gear train as indicated at 34, 35. The overrunning clutch 6 between flywheel and motor will, on such occasions, function to permit acceleration of the flywheel to a speed of, say, twelve or thirteen thousand R. P. M., without corresponding rotation of motor 8. Engagement of the jaws (by means 18) energizes the booster 32 if sufficient current is available—that is, if the battery 25 is not entirely exhausted. Such energization of the booster 32 will be brought about by reason of the closure of the switch 31 which results from the movement imparted from the entire linkage 16, 22, 23, 24, and 21 whenever meshing is produced either by manual actuation of the member 18 or by electromagnetic action due to the closure of the circuit to the solenoid 19. In this connection it will be noted that the solenoid 19 as as well as the ignition device 32 may function—assuming there is sufficient current in the battery—independently of the motor 8 if for any reason the latter is disabled or temporarily disconnected.

What I claim is:

1. In an engine starter, in combination with driving means in the form of an electric motor and driven means in the form of an engine engaging member, means including a mesh-rod operative to move said engine engaging member to engine engaging position, auxiliary driving means comprising a manually rotatable shaft and a set of gears drivably connecting said manually rotatable shaft with said engine-engaging member, means normally holding the mesh-rod in the withdrawn position, said means including a rock-shaft having a lever connection with said mesh-rod, means at the lever end of said mesh-rod for manual operation thereof independently of operation of either said manually rotatable shaft or the electric motor, and means including a second lever at the opposite end of said rock-shaft for operation of said mesh-rod concurrently with operation of the electric motor.

2. In an engine starter, in combination with driving means in the form of an electric motor and driven means in the form of an engine engaging member, means including a meshing element operative to move said engine engaging member to engine engaging position, auxiliary driving means comprising a manually rotatable shaft and a set of gears drivably connecting said shaft with said engine-engaging member, means for operating said meshing element independently of operation of either said manually rotatable shaft or the electric motor, and means for operating said meshing element concurrently with operation of the electric motor.

3. The combination, with an engine-engaging member, of a flywheel and a gear train drivably connecting said engine-engaging member and flywheel, meshing means for moving said engine-engaging member to engine-engaging position, means including an electromagnet for operating said meshing means, means including a manually rotatable shaft for storing energy in said flywheel independently of operation of said meshing means, means including an electric motor for rotating said flywheel, and means for simultaneously energizing said electric motor and electromagnet.

4. The method of operating an engine starter of the type having an engine-engaging member, a prime mover and an inertia member constituting part of the driving connections between said prime mover and said engine-engaging member, which method includes the step of moving said engine-engaging member to engine-engaging position concurrently with first energization of the prime mover, and which further includes the step of imparting high torque to the engine by way of said flywheel and engine-engaging member immediately following first energization of the prime mover and prior to any substantial acceleration of the inertia member.

5. The method of operating an engine starter of the type having an engine-engaging member, a prime mover and an inertia member constituting part of the driving connections between said prime mover and said engine-engaging member, which method includes the step of moving said engine-engaging member to engine-engaging position concurrently with first energization of the prime mover, also the step of imparting high torque to the engine by way of said flywheel and engine-engaging member immediately following first energization of the prime mover and prior to any substantial acceleration of the inertia member, said method being workable as an alternative to the acceleration of said flywheel prior to movement of said engine-engaging member to engine-engaging position and independently of any rotation of said motor.

ROMEO M. NARDONE.